United States Patent
Perrault et al.

(10) Patent No.: US 8,844,682 B2
(45) Date of Patent: Sep. 30, 2014

(54) ELECTROMECHANICAL AIRCRAFT BRAKE WITH TILTABLE ACTUATORS

(75) Inventors: Maurice Perrault, Davron (FR); Philippe Chico, Boulogne Billancourt (FR)

(73) Assignee: Messier-Bugatti-Dowty, Velizy, Villacoublay (FR)

( * ) Notice: Subject to any disclaimer, the term of this patent is extended or adjusted under 35 U.S.C. 154(b) by 911 days.

(21) Appl. No.: 11/429,258

(22) Filed: May 8, 2006

(65) Prior Publication Data
US 2007/0119664 A1    May 31, 2007

(30) Foreign Application Priority Data
Nov. 30, 2005   (FR) ...................... 05 12129

(51) Int. Cl.
F16D 55/36       (2006.01)
F16D 65/18       (2006.01)
F16D 121/24      (2012.01)

(52) U.S. Cl.
CPC ............ F16D 55/36 (2013.01); F16D 2121/24 (2013.01); F16D 65/18 (2013.01)
USPC ........ 188/71.5; 188/71.1; 188/72.4; 188/73.2

(58) Field of Classification Search
USPC ........... 188/71.5, 73.46, 71.1, 73.2, 72.4, 370
See application file for complete search history.

(56) References Cited

U.S. PATENT DOCUMENTS

| | | | | |
|---|---|---|---|---|
| 2,981,376 A | * | 4/1961 | Zeidler | 188/71.5 |
| 2,985,259 A | * | 5/1961 | Gardner | 188/71.5 |
| 4,222,463 A | * | 9/1980 | Domes et al. | 188/72.3 |
| 4,607,730 A | | 8/1986 | Paisley | |
| 6,095,293 A | * | 8/2000 | Brundrett et al. | 188/72.1 |
| 6,213,256 B1 | * | 4/2001 | Schaffer | 188/71.9 |
| 6,336,534 B1 | | 1/2002 | Rancourt | |
| 6,598,714 B1 | * | 7/2003 | Rinsma et al. | 188/71.9 |
| 7,156,212 B1 | * | 1/2007 | Ciotti et al. | 188/72.4 |
| 7,703,580 B2 | * | 4/2010 | Girod et al. | 188/72.1 |
| 2004/0245053 A1 | * | 12/2004 | Chico et al. | 188/71.5 |
| 2005/0029056 A1 | * | 2/2005 | Baumgartner et al. | 188/1.11 L |
| 2005/0167211 A1 | * | 8/2005 | Hageman et al. | 188/71.9 |

FOREIGN PATENT DOCUMENTS

| EP | 0 583 947 A2 | 2/1994 |
|---|---|---|
| EP | 1 084 949 A2 | 3/2001 |

* cited by examiner

*Primary Examiner* — Thomas J Williams
*Assistant Examiner* — Mariano Sy
(74) *Attorney, Agent, or Firm* — Sughrue Mion, PLLC

(57) ABSTRACT

The invention relates to an electromechanical brake, in particular for aircraft, the brake comprising a support carrying at least one electromechanical actuator comprising a pusher that is axially displaceable towards friction elements in order to apply a braking force to the friction elements, selectively, wherein the actuator is mounted on the support via a connection member allowing at least a portion of the actuator carrying the pusher to tilt angularly.

6 Claims, 1 Drawing Sheet

ELECTROMECHANICAL AIRCRAFT BRAKE WITH TILTABLE ACTUATORS

The present invention relates to an electromechanical brake, in particular for aircraft, with actuators that can be tilted angularly.

BACKGROUND OF THE INVENTION

Electromechanical aircraft brakes are known that comprise a support referred to as a "ring" carrying electromechanical actuators each comprising a pusher that can be moved axially towards a stack of disks in order to apply a braking force on the disks, selectively.

In general, the actuators are screwed directly to the support so that the connection between the support and the actuators is rigid.

Unfortunately, the support can become deformed under the effect of applying braking force, thereby entraining the actuator in said deformation. The pusher can then press against the disks in a direction that is not perpendicular to the disks, such that the pusher is subjected to a transversely-directed force. Unfortunately, actuators are generally fitted with ball screws or roller screws that are poor at accommodating transverse forces.

OBJECT OF THE INVENTION

An object of the invention is to provide a brake with a reduced risk of a transverse force appearing on a pusher during braking.

BRIEF DESCRIPTION OF THE INVENTION

In order to achieve this object, the invention provides an electromechanical brake, in particular for aircraft, the brake comprising a support carrying at least one electromechanical actuator comprising a pusher that is axially displaceable towards friction elements in order to apply a braking force against the friction element, selectively, in which, according to the invention, the actuator is mounted on the support via a connection member allowing at least a portion of the actuator carrying the pusher to tilt angularly.

Thus, when the pusher comes into contact with the disks, it automatically positions itself perpendicularly relative to the disks under the effect of the braking force by making use of the freedom of the actuator to tilt angularly. Then, regardless of the braking intensity and the amount of deformation the support has suffered, the pusher continues to push perpendicularly to the disks.

This freedom to tilt angularly thus makes it possible to reduce the risk of a transverse force being applied to the pusher.

BRIEF DESCRIPTION OF THE DRAWING

The invention can be better understood in the light of the following description given with reference to the figures of the accompanying drawing, in which.

DETAILED DESCRIPTION OF THE INVENTION

Figure 1:
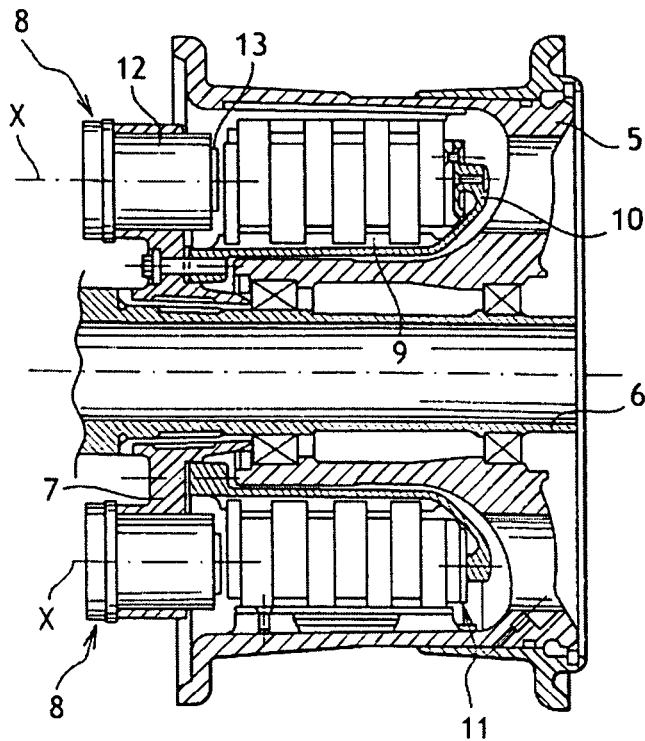
FIG. 1 is a section view of a conventional electromechanical brake.

With reference to FIG. 1, an aircraft brake is associated with a wheel comprising a wheel rim 5 mounted to revolve on an axle 6. The brake has a ring 7 mounted on the axle and prevent it from rotating relative thereto by means that are not shown. The ring 7 carries electromechanical actuators 8, each comprising a housing 12 in which a pusher 13 is mounted to slide in an axial direction X and exert a braking force selectively on a stack of disks 11 comprising disks that rotate with the wheel disposed in alternation with disks that are prevented from rotating by a torsion tube 9 secured to the ring 7.

In known manner, the pusher 13 is actuated by an associated electric motor of the actuator, the motor being arranged to cause one of the elements of a screw-and-nut system to turn (e.g. a system of the ball or roller type), with the pusher being secured to the other element of the system. An anti-rotation member prevents the pusher from turning.

Applying a braking force causes the disks 11 to rub against one another so that a fraction of the kinetic energy of the aircraft is dissipated as heat.

Figure 2:
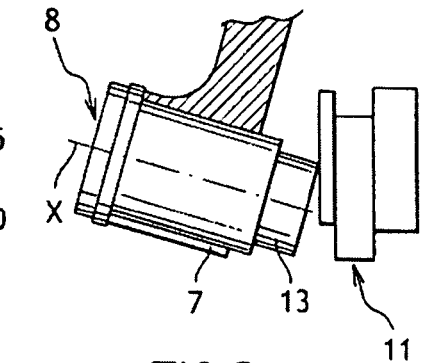
FIG. 2 is a detail view of FIG. 1 while a braking force is being applied, with the deformation being greatly exaggerated.

As can be seen in FIG. 2, the force exerted by the pushers 13 during braking can lead, in reaction, to the ring 7 becoming deformed by bending outwards, thereby tending to move the axis X from its initial position towards an oblique position in which the axis X is no longer perpendicular to the disks, such that the pusher 13 is subjected to transverse forces that are harmful to the screw-and-nut system of the actuator.

Figure 3:
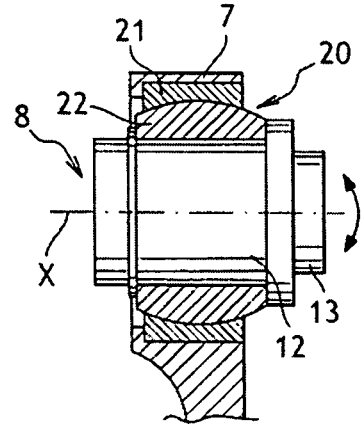
FIG. 3 is a fragmentary section view of an electromechanical brake in a first particular embodiment of the invention.

In a first particular embodiment of the invention as shown in FIG. 3, a ball joint 20 is interposed between the ring 7 and the actuator 8, the joint comprising a cage 21 that is received in an appropriate housing in the ring 7 together with a spherical core 22 mounted around the housing 12 of the actuator 8. An anti-rotation device (not shown) prevents the actuator from turning about the axis X.

Figure 4:
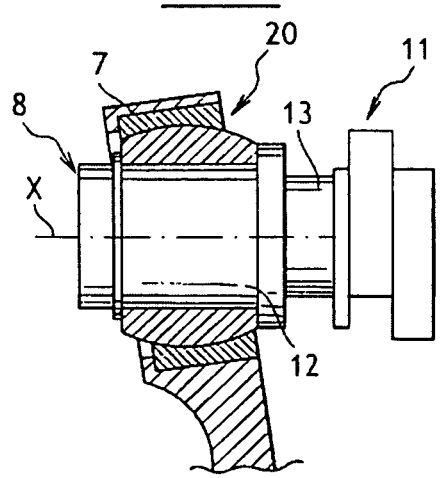
FIG. 4 is a detail view of the FIG. 3 brake while applying a braking force.

Thus, as the ring 7 deforms progressively with application of increasing braking force, the actuator tilts progressively because of the freedom in rotation given by the ball joint so as to continue pushing against the disks 11 in a direction that is perpendicular to the disks, as shown in FIG. 4. This prevents harmful transverse forces being generated on the screw-and-nut system of the actuator.

Figure 5:
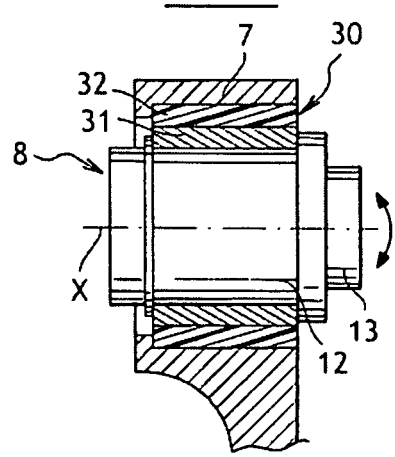
FIG. 5 is a fragmentary section view of an electromechanical brake in a second particular embodiment of the invention.

In a second particular embodiment as shown in FIG. 5, the ball joint is replaced by a composite bearing 30 comprising a first bushing 31 made of metal extending around the housing 12 of the actuator 8, and a second bushing 32 made of elastomer that is bonded to the first bushing 31 and that is received in a suitable housing in the ring 7.

The elastomer used for the second bushing 32 is an anisotropic elastomer disposed in such a manner that the second bushing 32 is substantially undeformable along the axial direction X while being deformable in radial directions, so as to allow the actuator 8 to tilt angularly, accompanied by a small amount of radial displacement of the actuator.

Thus, while ensuring that the (substantially axial) braking force is transmitted to the ring 7, the second bushing 32 allows the actuator 8 to move relative to the ring 7 so as to enable the pusher to remain substantially perpendicular to the disks.

Preferably, the elastomer used presents a high degree of damping in the frequency range that corresponds to the vibration generated by the disks rubbing against one another so that the actuator 8 and the ring 7 are not subjected to said vibration in full.

The invention is not limited to the description above, but on the contrary covers any variant coming within the ambit defined by the claims.

In particular, although freedom to move angularly is described as being given to the entire actuator relative to the actuator support, it would suffice for such freedom to be given between the portion of the actuator that carries the pusher and the support. It would then be appropriate for the connection between said portion of the actuator and the remainder of the actuator to be suitable for accommodating such freedom.

What is claimed is:

1. An electromechanical brake, the brake comprising:
   friction elements,
   at least one electromechanical actuator, said at least one electromechanical actuator comprising :
   a housing,
   a pusher that is moveable within said housing,
   a driving member comprising an electric motor that actuates said pusher, and,
   a transmission unit comprising a screw-and-nut system that is driven in rotation by said driving member and that drives in translation said pusher so as to move axially the pusher towards said friction elements in order to apply a braking force to the friction elements, selectively, and,
   a support carrying said at least one elecromechanical actuator,
   wherein both said driving member and said transmission unit extend inside said housing,
   wherein said at least one actuator is mounted on said support via a connection member that couples said housing to said support, allowing at least a portion of the actuator carrying the pusher to tilt angularly, whereby the pusher as a whole can entirely tilt angularly with respect to the support.

2. A brake according to claim 1, in which the connection member comprises a ball joint.

3. A brake according to claim 1, in which the connection member comprises a bearing that is substantially undeformable in an axial direction and that is deformable in radial directions.

4. A brake according to claim 3, in which the bearing is arranged to filter vibration coming from the friction elements during braking.

5. A brake according to claim 4, in which the bearing is a composite bearing including a bushing made of anisotropic elastomer material.

6. A brake according to claim 1, in which the actuator as a whole, including at least the housing and pusher, can entirely tilt angularly with respect to the support.

\* \* \* \* \*